United States Patent Office 3,761,435
Patented Sept. 25, 1973

3,761,435
POLYMERS OF ACRYLIC ESTER AND VINYL HALIDE MONOMERS WITH ALKYD MONOMERS
Richard H. Backderf, Richfield, George J. Antlfinger, Avon Lake, and Maynard C. Bodzash, Elyria, Ohio, assignors to The B. F. Goodrich Company, New York, N.Y.
No Drawing. Filed Oct. 28, 1971, Ser. No. 193,536
Int. Cl. C08c 17/18; C08d 13/18
U.S. Cl. 260—22 CB          10 Claims

ABSTRACT OF THE DISCLOSURE

Polymers of acrylic esters and vinyl halides containing alkyd monomers copolymerized therewith are useful as binders for paper and other nonwoven materials. The materials bound with such polymers exhibit increased wet tensile strength and increased heat stability to discoloration.

BACKGROUND OF THE INVENTION

Acrylic ester and vinyl halide polymers are known for their utility as binders for paper and other nonwoven materials. The materials are impregnated with the latices of such polymers and, after the water is removed, the polymers adhere to the fibers improving tensile strength, internal bond strength, edge tear, and the like. Finished articles made from these bound materials often come into contact with water and other liquids during washing and dry cleaning. It is important, then, that the bound materials also have good wet tensile strength. The art teaches the use of alkyd resins or drying oils to be physically admixed with the polymer latices. However, materials bound with such physical mixtures of alkyd resin or drying oil with polymer latices will discolor on heat aging as in heat cycles of laundry or dry cleaning operations.

SUMMARY OF THE INVENTION

The invention provides polymers of acrylic ester or vinyl halide monomers containing copolymerized therewith an alkyd monomer(s), such monomer prepared by the transesterification of an unsaturated triglyceride with a monoolefinically unsaturated carboxylic acid. The polymers are useful as binders for paper and other nonwoven materials. The materials bound with these polymers show an improved combination of wet tensile strength and heat stability to discoloration.

DETAILED DESCRIPTION

The alkyd monomers are prepared by a catalyzed transesterification between an unsaturated triglyceride and a monoolefinically unsaturated carboxylic acid. The reaction can result in the replacement of all three unsaturated fatty acid ester groups on the triglyceride, but only about one mole of unsaturated carboxylic acid for one mole of triglyceride is used. The alkyd monomer, then, can be postulated by the structure

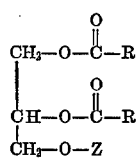

wherein R is a fatty acid group containing from about 12 to about 24 carbon atoms, and Z is the ester residue of a monoolefinically unsaturated mono- or polycarboxylic acid, or of the esters, anhydrides, or metal salts thereof.

The monoolefinically unsaturated mono- and dicarboxylic acids have the formula (A) 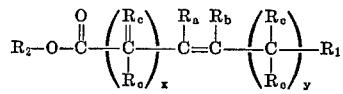

(B) 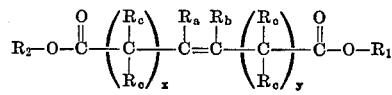

(C) 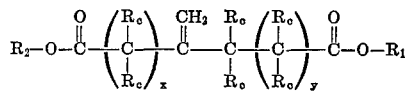

wherein $R_a$ and $R_b$ are —H, —$CH_3$, or —$C_2H_5$; $x$ and $y=0$ to 12; and $R_1$, $R_2$ and $R_c$ are selected from the group consisting of —H, an alkyl group containing 1 to 24 carbon atoms, an alkoxyalkyl group containing a total of 2 to 12 carbon atoms in the group, an alkyl thioalkyl group containing a total of 2 to 12 carbon atoms in the group, a hydroxyalkyl group containing 1 to 12 carbon atoms in the group, and a cyanoalkyl group containing 1 to 12 carbon atoms in the group.

Typical examples of Formula A compounds are:
When $x$ and $y=0$ and $R_a$, $R_b$, $R_1$, and $R_2$ are defined as above:

Acrylic acid, methacrylic acid, ethacrylic acid, β,β-dimethylacrylic acid, crotonic acid and isocrotonic acid, 2-methyl-2-butenoic acid, and the acrylates, methacrylates, and ethacrylates such as methyl acrylate, ethyl acrylate, isobutyl acrylate, hexyl acrylate, octyl acrylate, 2-ethylhexyl acrylate, decyl acrylate, dodecyl acrylate, octadecyl acrylate, methyl methacrylate, n-butyl methacrylate, n-octyl methacrylate, n-decyl methacrylate, ethyl ethacrylate, methoxy ethyl acrylate, ethoxy ethyl acrylate, methoxy ethyl methacrylate, methylthioethyl acrylate, β-hydroxyethyl acrylate, α-cyanomethyl acrylate, γ-cyanopropyl acrylate, and the like.

When $x=0$ and $y=1$ to 12 and $R_a$, $R_b$, $R_c$, $R_1$, and $R_2$ are defined as above:

2-pentenoic acid, 2-hexenoic acid, 4-methyl-2-pentenoic acid, 2-heptenoic acid, 3-ethyl-2-pentenoic acid, 2-octenoic acid, 2-nonenoic acid, and the like, and methyl-2-pentenoate, methyl trans-3-methyl-2-pentenoiate, ethyl-2-hexenoate, propyl-2-heptenoate, and the like.

When $x$ and $y=1$ to 12 and $R_a$, $R_b$, $R_c$, $R_1$, and $R_2$ are defined as above:

Oleic acid and elaidic acid.

Examples of Formula B compounds are:
When $x$ and $y=0$ and $R_a$, $R_b$, $R_1$, and $R_2$ are defined as above:

Maleic acid and fumaric acid, citraconic acid and mesaconic acid and the esters thereof such as diethyl fumarate, methyl ethyl fumarate, isobutyl propyl fumarate, t-butyl ethoxyethyl fumarate, and the like, and diethyl citraconate, n-butyl propyl citraconate, and the like.

Furthermore, the anhydrides of these diacids are useful such as maleic anhydride and citraconic anhydride.

Examples of Formula C compounds are:
When $x$ and $y=0$ and $R_a$, $R_b$, $R_1$, and $R_2$ are defined as above:

Itaconic acid, dithyl itaconate, and the like.

Monoolefinically unsaturated polycarboxylic acids, meaning those having more than two carboxy groups, can be described as carboxy substituents of the Formula B and C compounds. For example, 1,2,3-propenetricarboxylic acid is Formula B wherein $x$ and $y=0$, $R_a$, $R_1$, and $R_2$ are —H, and $R_b$ is —COOH.

Normally used are the monoolefinically unsaturated dicarboxylic acids (or esters or anhydrides thereof) of the B formula wherein $x$ and $y=0$. More used are the compounds having the formula

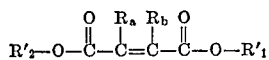

wherein $R_a$ and $R_b$ are defined as above and $R'_1$ and $R'_2$ are selected from the group consisting of —H, an alkyl group containing 1 to 24 carbon atoms, an alkoxyalkyl group containing 2 to 12 carbon atoms in the group, and an alkyl thioalkyl group containing 2 to 12 carbon atoms in the group. Even more used are the compounds wherein $R_1$ and $R_2$ are —H or an alkyl group containing 1 to 10 carbon atoms. Examples of such compounds are maleic acid, fumaric acid, citraconic acid, mesaconic acid, methylethyl fumarate, diethyl fumarate, ethylhexyl fumarate, dioctyl fumarate, diethyl citraconate, dibutyl citraconate, and the like. Also frequently used are maleic anhydride and citraconic anhydride.

The triglycerides used are fatty acid esters of glycerol. These compounds are readily found in various animal, vegetable, and marine products. The iodine number of these compounds ranges from about 100 to over 400. The fatty acid groups are aliphatic groups containing from about 12 to about 24 carbon atoms in each group. The groups can be the same or mixes of fatty acid groups can be present. These groups can be saturated but at least one and preferably two or all three are unsaturated. The molecular weight of the triglycerides is from about 400 to about 1000. Typical examples of such compounds are sardine oil, poppy seed oil, linseed oil, corn oil, perilla, sunflower seed oil, sesame seed oil, safflower seed oil, dehydrated castor oil, menhaden, rosin oil, tung oil, and the like.

The transesterification reaction between the triglyceride and the unsaturated carboxylic acid is performed in the temperature range from about 50° C. to about 150° C. in the presence of a catalyst. The catalyst can be an acid catalyst such as the mineral acids like hydrochloric acid and phosphoric acid. The amount of catalyst used is catalytic, ranging from about 0.001 mole to about 0.1 mole per one mol of triglyceride used.

The reaction is usually conducted in the presence of an aliphatic alcohol. The purpose of the alcohol is to esterify with the replaced fatty acid group(s) so that free fatty acid groups do not remain in the alkyd monomer solution. The alcohols are low molecular weight saturated aliphatic alcohols, ranging in molecular weight from about 30 to about 200. The alcohols can be monohydric or polyhydric. Normally, the alcohols used are saturated alkyl alcohols containing two or three hydroxy groups. Examples of such are ethylene glycol, propylene glycol, trimethylene glycol, 1,4-butanediol, 1,8-octanediol, diethylene glycol and the like, and glycerol, trimethylol propane, and the like. The alcohol is used in amounts up to one mole per one mole of carboxylic acid used.

When polyhydric alcohols and/or polycarboxylic acids are employed with the triglycerides in the transesterification reaction, there is a probability that bis-triglyceride and polytriglyceride structures are formed. As such, the molecular weight of these structures ranges from about 1000 to about 4000.

As can be readily deduced, the reaction product resulting from the transesterification reaction is a mixture of components which include the alkyd monomer structure as postulated above along with some probable di- and possibly some tri-substituted triglycerides, probable bis- and polytriglyceride structures, fatty acid-alcohol reaction products, and original starting compounds. The iodine number of the alkyd monomer mixture ranges from about 50 to about 400. The mixture can be used as is with the acrylic ester and vinyl halide monomers to prepare the polymers of this invention. Normally the reaction product mixture is heated under reduced pressure to remove low boiling components prior to use. The main characteristic of an alkyd monomer mixture is that it readily copolymerizes with vinyl monomers containing a terminal vinylidene group, presumably through the unsaturated acid ethylene ($>C=C<$) group, whereas the original unsaturated triglycerides by themselves do not readily polymerize or copolymerize. Once copolymerized within the polymer molecule, the residual unsaturation in the fatty acid ester groups is available for post-polymerization crosslinking.

The alkyd monomers are copolymerized with vinyl halide or acrylic ester monomers to form the polymers of this invention. They are used in the range from about 0.5% to about 20% by weight based upon the weight of the monomers charged, and more preferably from about 3% to about 15% by weight.

The vinyl halide monomers employed are of the formula

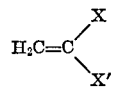

wherein X is a halogen such as chlorine, bromine, or fluorine and X' is either hydrogen or is defined as X. Typical examples are vinyl chloride, vinyl bromide, vinyl fluoride, vinylidene chloride, vinylidene fluoride, and the like. Preferred vinyl halides are vinyl chloride and vinylidene chloride. The vinyl halides are used in the range from about 25% to about 99% by weight based upon the monomers charged, but more preferably from about 50% to about 97% by weight.

The acrylic ester monomers employed are of the formula

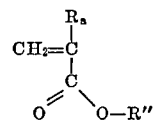

wherein $R_a$ is —H, —$CH_3$, or —$C_2H_5$, and R" is an alkyl group containing from 1 to about 18 carbon atoms, an alkyl alkoxy or alkyl thioalkyl group containing from 2 to about 8 carbon atoms in the group, a cyanoalkyl group containing from 1 to about 8 carbon atoms in the group, or a hydroxyalkyl group containing from 1 to about 8 carbon atoms in the group. The carbon structure in the alkyl groups can be linear or branched, i.e., can contain primary, secondary, or tertiary carbon configurations. Examples of such monomers are methyl acrylate, ethyl acrylate, isobutyl acrylate, hexyl acrylate, octyl acrylate, 2-ethylhexyl acrylate, decyl acrylate, dodecyl acrylate, octadecyl acrylate, methyl methacrylate, n-butyl methacrylate, n-octyl methacrylate, n-decyl methacrylate, ethyl ethacrylate, and the like; methoxy ethyl acrylate, ethoxy ethyl acrylate, and the like, and methylthioethyl acrylate and the like; α-cyanomethyl acrylate, α, β and γ-cyanopropyl acrylate, and the like; and β-hydroxyethyl acrylate and the like. Excellent results have been obtained when an alkyl acrylate containing 1 to about 10 carbon atoms in the R" was used. The acrylic ester monomer is used in the range from about 25% to about 99% by weight based upon the weight of the monomers charged and, more preferably from about 70% to about 97% by weight.

Copolymerized with the alkyd monomer(s) and the vinyl halide(s) or acrylic ester(s) can be one or more aliphatic vinylidene monomers containing a terminal ($CH_2=C<$) group. Examples of such monomers are the acrylic esters as mentioned above but also including types such as cyclohexyl acrylate, glycidyl acrylate, haloalkyl acrylates such as chloroethyl acrylate and the like; the aforementioned vinyl halides; vinyl and allyl esters such as vinyl acetate, vinyl butyrate, vinyl chloroacetate, and the like, and allyl acetate, methallyl propionate, and the like; vinyl and allyl ethers such as ethyl vinyl ether, butyl vinyl ether, cyclohexyl vinyl ether, and the like, and allyl methyl ether and the like; allyl alcohols such as methallyl alcohol and the like; vinyl amides such as acrylamide, N-methyl acrylamide, N-methylol acrylamide, and the like; vinyl nitriles such as acrylonitrile, methacrylonitrile, and the like; vinyl acids such as acrylic acid, methacrylic acid, vinyl acetic acid, and the like; $\alpha$-monoolefins such as ethylene, propylene, and the like; diolefins such as 1,3-butadiene, isoprene, chloroprene, 1,5-hexadiene, and the like; and divinyls such as divinyl ether, diallyl ether, diethylene glycol diacrylate, and the like. Excellent results have been obtained when 2-ethylhexyl acrylate was used with vinyl chloride, vinylidene chloride, and the alkyd monomer.

The copolymerizable vinylidene monomers can be used with the vinyl halide or acrylic ester monomers in minor amounts, less than 50% by weight of the monomers charged and preferably less than 25% by weight.

Vinyl halide or acrylic ester polymers wherein the polymer contains polymerized units of an alkyd monomer can be prepared via latex polymerization in the conventional manner. Typical latex polymerization ingredients would include a catalyst(s), water adjusted to a desired pH using acids or bases and usually buffered using an inorganic salt, and surface active agents. Examples of catalysts include the organic peroxides and hydroperoxides such as benzoyl peroxide, dicumyl peroxide, cumene hydroperoxide, paramethane hydroperoxide, and the like; diazos such as azo-bis-isobutyronitrile; persulfates such as potassium persulfate, ammonium persulfate, and the like; and ultra-violet light used with photosensitive agents. The use of redox systems along with organic peroxides or hydroperoxides is commonly employed. Molecular weight modifiers may be used if desired.

The surface active agents can be anionic, cationic, or nonionic. Typical examples of such are sodium, potassium, sulfonate, and phosphate esters of fatty acids, quaternary salts, polyglycol fatty acid esters, and the like. The agents are used in amounts of up to about 6% by weight based upon the weight of the monomer.

The polymerization process can be a batch process or a continuous process wherein one or more monomers and/or ingredients may be proportioned throughout the polymerization. Polymerization temperature is not critical and will generally range from about $-30°$ C. to about $100°$ C., whereas a more preferred range is from about $0°$ C. to about $90°$ C.

The resulting latices contain from about 20% by weight to about 70% by weight of latex of polymer solids. The latices can be stored for extended periods of time at room temperatures. Prior to use ingredients such as fillers, antioxidants, plasticizers, pigments, stabilizing agents, and the like may be admixed. The latices can be used to impregnate nonwoven materials at any total solids content, but for ease and convenience of application and for high polymer pick-up by the material, the latices are generally used at about 15% to about 25% by weight of total solids.

The polymers can be isolated from the latices by coagulation using salt/acid systems, freeze coagulation, alcohols such as methanol, and other known compounds and systems. The isolated polymers are of high molecular weight, having dilute solution viscosities (DSV) above 0.5. Films of the polymers will undergo crosslinking through the residual unsaturation.

The latices are applied to the nonwoven materials using dip-coating, knife coating, roller coating, spraying, and like techniques. Typical nonwoven materials are papers such as 10 mil flat Kraft paper, 6 mil crepe paper, and the like; and nonwoven fibrous materials such as rag fibers, cotton, wool, regenerated cellulose, and the like. The materials are impregnated with the latices, dried, and cured. Curing is done at elevated temperatures, from about $250°$ F. to about $350°$ F. for times from about 2 minutes to about 30 minutes, or at room temperatures. Oxidative catalysts such as metal octoates and naphthanates can catalyze the cure.

The following examples serve to illustrate the invention more clearly. Ingredients are given in grams unless otherwise indicated.

Example I

Acrylic ester polymer latices were prepared using as the alkyd monomer the transesterification reaction product of safflower seed oil with fumaric acid, hereafter to be called safflower seed oil monomer. Properties of the alkyd monomer were Gardner color—3; acid number—19; iodine number—73; saponification equivalent—139. The latices were prepared using the following recipes.

| | 1 | 2 | 3 |
|---|---|---|---|
| Water, gms | 600 | 600 | 600 |
| Ethyl acrylate, gms | 400 | 400 | 400 |
| Safflower seed oil monomer, gms | | 20 | 66 |
| Sul Fon Ate,[1] gms | 6 | 6 | 0 |
| NaHCO$_3$, gms | 0.8 | 0.8 | 0.8 |
| K$_2$S$_2$O$_8$, gms | 0.8 | 0.8 | 0.8 |

[1] Sodium salt of dodecyl benzene sulfonic acid, 30% by weight in water.

200 grams of water, the sodium bicarbonate, and the potassium persulfate were charged to a reactor vessel equipped with a dropping funnel, condenser, and an agitator. The ethyl acrylate, safflower seed oil monomer, Sul Fon Ate soap, and remaining water were mixed in a separate vessel. 200 milliliters of the resulting emulsion were initially charged to the reactor vessel, the remainder being proportioned into the vessel throughout the run. The emulsion was agitated for 90 minutes at about $85°$ C., and then the temperature raised to $95°$ C. for about 15 minutes. Total reaction time was about 2 hours for each sample. Percent conversion of monomers was 95% for sample 1, 95% for sample 2, and 90% for sample 3.

A small portion of each sample was dried down at room temperature to provide polymer films. Dilute solution viscosities (DSV) were measured on samples 1 and 3 at a concentration of 0.198 gram of polymer in 50 milliliters of tetrahydrofuran. Sample 1 had a DSV of 1.19, and sample 3 of 0.54. The polymers were analyzed as to their compositions by iodine number. The samples contained in weight percent based on the polymer, sample 1, 100% ethyl acrylate; sample 2, 95% ethyl acrylate, 5% safflower seed oil monomer; sample 3, 87% ethyl acrylate, 13% safflower seed oil monomer. The alkyd monomer readily copolymerized with the ethyl acrylate.

Example II

The latices prepared in Example I were evaluated as binders for paper. The latices were diluted to about 15% by weight of total solids to provide for high polymer pick-up. The paper used was a flat 10 mil Kraft paper having a tensile strength of about 30 lbs./inch. The latex was poured into a tray and the paper floated in the latex for 10 seconds on each side and then hung vertically to drip dry. Polymer pick-up was about 40% by weight for each latex sample. The saturated papers where then cured for 3 minutes at $325°$ F. or for 30 minutes at $350°$ F. The cured papers were cut into 1 inch by 6 inch lengthwise strips for testing.

Tensile and elongation were determined using an Instron or a Thwing-Albert Hydraulic Tensile Tester using a pull rate of 12 inches per minute. Wet tensile was run after soaking the strips for 16 hours in water following the TAPPI Procedure T465–m44. The following table lists the results of the tests.

| | Cured 3' at 325° F. | | | Cured 30' at 350° F. | | |
|---|---|---|---|---|---|---|
| | 1 | 2 | 3 | 1 | 2 | 3 |
| Tensile strength, p.p.i.: | | | | | | |
| Dry | 39.6 | 40.1 | 38.0 | 31.7 | 34.7 | 43.0 |
| Wet | 2.5 | 5.3 | 7.9 | 5.4 | 9.6 | 18.4 |
| Percent wet strength retained | 6 | 13 | 21 | 17 | 28 | 43 |

The example demonstrates that the wet tensile strength of papers using the latices of this invention can be improved by 200% to 300%.

Example III

The latices of Example I were also evaluated as nonwoven binders. 10 mil Kraft paper was saturated as in Example II and cured for 5 minutes at 275° F. The cured papers were cut into strips and tested as in Example II plus a solvent tensile test. In this test 1 inch by 6 inch samples are cut lengthwise and soaked in perchloroethylene for 20 minutes, blotted, and pulled to evaluate tensile as in Example II. Results are as follows:

|  | Cured 5' at 275° F. | | |
| --- | --- | --- | --- |
|  | 1 | 2 | 3 |
| Tensile strength, p.p.i.: |  |  |  |
| Dry | 40.3 | 40.0 | 38.1 |
| Wet | 1.8 | 3.7 | 5.4 |
| Percent wet strength retained | 4 | 9 | 14 |
| Elongation, percent | 6.2 | 5.6 | 4.9 |
| Solvent tensile, p.p.i | 21.2 | 20.5 | 19.8 |

The sample demonstrates that the polymers of this invention improve the wet tensile strength of nonwovens by up to 200% to 300%. Solvent tensile is comparable to the latex control (sample 1).

Example IV

Two vinyl halide latices were prepared using the safflower seed oil monomer as used in Example I. The recipes used are as follows:

|  | 1 | 2 |
| --- | --- | --- |
| Water, gms | 1,200 | 1,300 |
| Vinyl chloride, gms | 625 | 700 |
| Vinylidene chloride, gms | 155 | 125 |
| 2-ethylhexyl acrylate, gms | 310 | 180 |
| Safflower seed oil monomer, gms | 50 | 100 |
| Santomerse S,[1] gms | 39 | 48 |
| Igepal 710,[2] gms | 21 | 14 |
| NaHCO$_3$, gms | 0.6 | 0.6 |
| K$_2$S$_2$O$_8$, gms | 4 | 5 |

[1] Sodium salt of dodecyl benzene sulfonic acid, 30% by weight in water.
[2] Nonionic emulsifier.

The water, vinyl chloride, sodium bicarbonate, potassium persulfate, 6 gms. of soap, and about 10% by weight of the vinylidene chloride and ethylhexyl acrylate were charged to a reactor vessel. The nonionic emulsifier, the safflower seed oil monomer, and the remaining vinylidene chloride and ethylhexyl acrylate were mixed in a separate vessel and metered to the polymerization during the run. The remaining soap was also metered separately. Polymerization temperature was 55° C. Sample 1 reached 42% conversion in 8 hours, and sample 2 reached 58% conversion in 12 hours. Small portions of each latex were dried down to obtain polymer films which were analyzed as to chlorine content and iodine number. Sample 1 was about 40% vinyl chloride, 19% vinylidene chloride, 37% ethylhexyl acrylate, and 4% safflower seed oil monomer; and sample 2 had a composition of 50% vinyl chloride, 16% vinylidene chloride, 21% ethylhexyl acrylate, and 13% safflower seed oil monomer, both in weight percents based upon the weight of the polymer. The alkyd monomer readily copolymerized with the vinyl halides.

Example V

Latex sample 2 of Example IV was evaluated as a binder for paper. Evaluated along with sample 2 was a vinyl halide latex control whose composition was 46% vinyl chloride, 16% vinylidene chloride, 36% ethylhexyl acrylate, and 2% acrylic acid, all percents as weight percents. Procedures and testing were the same as followed in Example II. Percent pick-up was 47% by weight for latex sample 2 and 48% by weight for the control. Internal bond strength was determined by sandwiching the saturated paper between two pieces of Bondex tape and sealing for 30 seconds at 275° F. on a heated plate with a pressing iron. The samples were pulled on a Thwing-Albert at the rate of 12 inches per minute. Edge tear resistance was determined according to the TAPPI Procedure T470 wherein a cured strip is placed over a Finch edge tear stirrup and pulled on a tensile tester at the rate of 12 inches per minute. The test data is listed in the following table.

|  | Cured 3' at 325° F. | |
| --- | --- | --- |
|  | Control | Latex 2 |
| Tensile strength, p.p.i.: |  |  |
| Dry | 53.0 | 57.3 |
| Wet | 14.8 | 21.4 |
| Percent wet strength retained | 28 | 37 |
| Elongation, percent | 3.5 | 4.1 |
| Internal bond strength, oz./inch | 9.0 | 10.2 |
| Edge tear, lbs./inch | 4.1 | 4.7 |

The example demonstrates that the vinyl halide latices containing alkyd monomers are useful for improving the wet strength of papers. This particular latex polymer also improved bond strength and edge tear of the paper.

Although this example is drawn to the use of the vinyl halide latices as binders for paper, they are also useful for binding nonwoven fabrics and the like. The cured films of these latices exhibit tensile strengths in excess of 200 lbs./inch$^2$ and elongations over 200%.

Example VI

Latex sample 3 of Example I was evaluated as to its heat stability. Included as a control was a film of a physical mixture of latex sample 1 with 13% by weight of a non-copolymerizable alkyd resin, based upon the weight of the polymer in the latex. The alkyd resin used was Synvarex 1A6–Z, the interaction product of safflower seed oil, phthalic acid (a non-polymerizable dicarboxylic acid), and an unsaturated aliphatic polyhydric alcohol.

The films were prepared by casting a 6 mil film of each latex on a release surface, drying the latex, and curing the polymer film for 30 minutes at 350° F. The heat stability test consisted of heat aging the films at 300° F. and measuring the Photovoltmeter Reflectance of the films. The values obtained were based on a standard value of 76.0 as being normal. Lower values indicate that less reflectance is occurring, and that color (discoloration) is developing. The following table lists the results:

|  | Photovoltmeter reflectance values | |
| --- | --- | --- |
|  | Latex 3 [1] | Latex mix [2] |
| Minutes at 300° F.: |  |  |
| 0 | 71.5 | 71.5 |
| 15 | 62.5 | 55.0 |
| 30 | 60.0 | 54.0 |
| 45 | 58.0 | 48.0 |
| 60 | 56.0 | 42.0 |
| Percent decrease in value | 22 | 41 |

[1] 87% ethyl acrylate/13% safflower seed oil monomer.
[2] Physical mixture of latex 1 with 13% by weight (based on the polymer) of safflower seed oil resin.

The example demonstrates that although some color development does occur in the films of this invention it is much less than the color development occurring in films of the physical mixture of latex and alkyd resin.

The polymers of this invention are useful as binders for paper and other nonwovens. Their use increases the wet tensile strength of nonwovens dramatically over the use of latices having similar composition but containing no alkyd monomers. The increase in wet tensile strength is comparable to the increase obtained when using physical mixtures of latices with alkyd resins or drying oils, but their heat stability to discoloration is superior to that of such mixtures. As such, the polymers of the invention offer an improved combination of wet tensile strength and heat stability.

Papers and nonwovens saturated with the polymers are useful as backings for adhesive and masking tapes, felts for underlays and nonwoven fabrics and cloths for garments, bedding articles, and the like.

We claim:

1. An article comprising a nonwoven material bound with a copolymer of (1) from about 25 percent to about 99 percent by weight based upon the weight of the polymer of a monomer selected from the group consisting of an acrylic ester of the formula

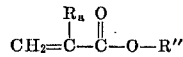

wherein $R_a$ is H, $CH_3$, or $C_2H_5$ and R'' is selected from the group consisting of an alkyl group, an alkoxyalkyl group, and a cyanoalkyl group containing from 1 to about 18 carbon atoms, and a vinyl halide of the formula

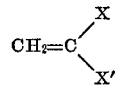

wherein X is a halogen and X' is selected from the group consisting of H and a halogen, (2) from about 0.5 percent to about 20 percent by weight based upon the weight of the polymer of an alkyd monomer transesterification reaction product of a triglyceride having an iodine number from about 100 to about 400 and a molecular weight from about 400 to about 1000 with a monoolefinically unsaturated carboxylic acid or ester selected from the group consisting of (A) 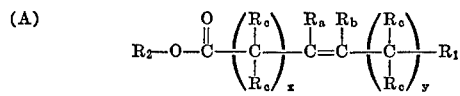

(B) 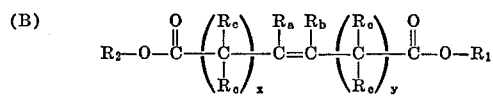

and (C) 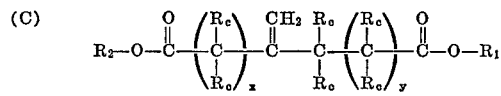

wherein $R_a$ and $R_b$ are H, $CH_3$, or $C_2H_5$; $x$ and $y$ are 0 to 12; and $R_1$, $R_2$, and $R_c$ are selected from the group consisting of H, an alkyl group containing 1 to 24 carbon atoms, an alkoxyalkyl group containing a total of 2 to 12 carbon atoms in the group, an alkyl thioalkyl group containing a total of 2 to 12 carbon atoms in the group, a hydroxyalkyl group containing 1 to 12 carbon atoms in the group, and a cyanoalkyl group containing 1 to 12 carbon atoms in the group, and (3) 0 to 50 percent by weight based upon the weight of the polymer of a copolymerizable vinylidene monomer containing a terminal ($CH_2=C<$) group.

2. An article of claim 1 wherein said monoolefinically unsaturated carboxylic acid has the formula

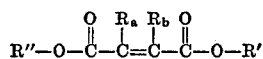

wherein $R_a$ and $R_b$ are H, $CH_3$, or $C_2H_5$, and R' and R'' are selected from the group consisting of H, an alkyl group containing 1 to about 24 carbon atoms, an alkoxyalkyl group containing 2 to 12 carbon atoms in the group, and an alkyl thioalkyl group containing 2 to 12 carbon atoms in the group.

3. An article of claim 2 wherein said polymer is of from about 50 percent to about 97 percent by weight of a monomer selected from the group consisting of an alkyl acrylate wherein the alkyl group contains 1 to about 10 carbon atoms, vinyl chloride, vinylidene chloride, and mixtures thereof, and from about 3 percent to about 15 percent by weight of an alkyd monomer transesterification reaction product of safflower seed oil with fumaric acid, and 0 to 35 percent by weight of a copolymerizable vinylidene monomer containing a terminal ($CH_2=C<$) group.

4. An article of claim 3 wherein the said polymer consists of 87 percent by weight of ethyl acrylate and 13 percent by weight of said alkyd monomer.

5. An article of claim 3 wherein said polymer consists of 95 percent by weight of ethyl acrylate and 5 percent by weight of the said alkyd monomer.

6. An article of claim 3 wherein the said polymer consists of 40 percent by weight of vinyl chloride, 19 percent by weight of vinylidene chloride, 37 percent by weight of 2-ethylhexyl acrylate, and 4 percent by weight of said alkyd monomer.

7. An article of claim 3 wherein the said polymer consists of 50 percent by weight of vinyl chloride, 16 percent by weight of vinylidene chloride, 21 percent by weight of 2-ethylhexyl acrylate, and 13 percent by weight of said alkyd monomer.

8. An article of claim 2 wherein the monoolefinically unsaturated carboxylic acid is fumaric acid.

9. An article of claim 1 wherein the nonwoven material is paper.

10. An article of claim 9 wherein said monomer is ethyl acrylate.

References Cited
UNITED STATES PATENTS

| | | | |
|---|---|---|---|
| 2,537,949 | 1/1951 | Adams | 260—22 CB |
| 2,550,114 | 4/1951 | Foster | 260—22 CB |
| 3,306,866 | 2/1967 | Percival et al. | 260—22 CB |
| 3,389,104 | 6/1968 | Austin et al. | 260—22 CB |
| 3,620,989 | 11/1971 | Cummings | 260—22 CB |
| 3,515,690 | 6/1970 | Hunt | 260—22 CB |
| 3,520,840 | 7/1970 | Que | 260—22 CB |
| 3,629,169 | 12/1971 | Bedighian | 260—22 CB |

FOREIGN PATENTS

| | | | |
|---|---|---|---|
| 677,811 | 1/1964 | Canada | 260—22 CB |

DONALD E. CZAJA, Primary Examiner

R. W. GRIFFIN, Assistant Examiner

U.S. Cl. X.R.

117—140 A, 155 UA, 161 UT, 161 UC; 260—23 P, 29.2 UA

PO-1050
(5/69)

UNITED STATES PATENT OFFICE
CERTIFICATE OF CORRECTION

Patent No. 3,761,435  Dated September 25, 1973

Inventor(s) Richard H. Backderf, George J. Antlfinger and Maynard C. Bodzash

It is certified that error appears in the above-identified patent and that said Letters Patent are hereby corrected as shown below:

Column 2, in formula "A", that portion of the formula reading $$"R_2-O-\overset{\overset{O}{\|}}{C}-(\overset{\overset{R_C}{\|}}{\underset{R_C}{C}})_x"$$  should read $$---R_2-O-\overset{\overset{O}{\|}}{C}-(\overset{\overset{R_C}{|}}{\underset{R_C}{C}})_x ---.$$

In the References cited, Column 10, insert U.S. Patent No. 3,486,930  12/1969  Antlfinger, et al  117-155 UA.

Signed and sealed this 9th day of July 1974.

(SEAL)
Attest:

McCOY M. GIBSON, JR.  C. MARSHALL DANN
Attesting Officer  Commissioner of Patents